(12) United States Patent
Horie et al.

(10) Patent No.: US 6,443,628 B1
(45) Date of Patent: Sep. 3, 2002

(54) OPTICAL FIBER CONNECTING DEVICE, ELECTRONIC EQUIPMENT, NETWORK SYSTEM AND OPTICAL FIBER CONNECTING METHOD

(75) Inventors: Kazuyoshi Horie; Kuninori Shino, both of Tokyo; Kenichi Ookubo, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/469,696

(22) Filed: Dec. 22, 1999

(30) Foreign Application Priority Data

Dec. 24, 1998 (JP) ............................................. 10-368001

(51) Int. Cl.[7] ................................................. G02B 6/38
(52) U.S. Cl. .............................. 385/73; 385/53; 385/70; 385/77; 385/58; 385/62; 385/81
(58) Field of Search ............................. 385/53, 54, 58, 385/70, 71, 62, 72, 73, 76, 77, 81, 139

(56) References Cited

U.S. PATENT DOCUMENTS

| | | | | |
|---|---|---|---|---|
| 4,087,158 A | * | 5/1978 | Lewis et al. ............... | 385/73 X |
| 4,186,998 A | * | 2/1980 | Holzman .................... | 385/73 X |
| 4,212,514 A | * | 7/1980 | Prunier et al. ............ | 385/73 X |
| 4,512,630 A | * | 4/1985 | Runge ....................... | 385/73 X |

FOREIGN PATENT DOCUMENTS

| | | | | |
|---|---|---|---|---|
| WO | WO 97/19375 | 5/1997 | ............... | 385/73 X |

* cited by examiner

*Primary Examiner*—Brian Healy
(74) *Attorney, Agent, or Firm*—Frommer Lawrence & Haug LLP; William S. Frommer; Joe H. Shallenburger

(57) ABSTRACT

An optical fiber connecting method and apparatus in which optical communication is performed in a uni-core bidirectional system as optical crosstalk is prevented from occurring. To this end, an optical fiber connector 1 includes a refractive index matching member 2 and an optical fiber connecting unit 5. The refractive index matching member 2 has a refractive index substantially equivalent to that of the cores of optical fibers 101, 102. The optical fiber connecting unit 5 interconnects the optical fibers 101, 102 in a state in which end faces 101a, 102a of the optical fibers 101, 102 are contacted with a refractive index matching member 2 interposed between the end faces 101a, 102a of the optical fibers 101, 102.

6 Claims, 14 Drawing Sheets

OPTICAL FIBER CONNECTING DEVICE, ELECTRONIC EQUIPMENT, NETWORK SYSTEM AND OPTICAL FIBER CONNECTING METHOD

BACKGROUND OF THE INVENTION

1. Field of the Invention

This invention relates to an optical fiber connecting apparatus for interconnecting optical fibers in series, an electronic equipment, a network system and an optical fiber connecting method. More particularly, it relates to an optical fiber connecting method, an electronic equipment, a network system and an optical fiber connecting method which can be used with advantage for interconnecting optical fibers in constructing an optical fiber network.

2. Description of the Prior Art

There is an optical fiber network by so-called light communication in which e.g., digital signals are transmitted using an optical fiber. In e.g., an optical fiber network, it is possible to interconnect e.g., household electrical products or information equipments with one another.

Heretofore, an optical fiber is formed of glass. With the advent of the plastic optical fiber (POF), it has become possible to construct an optical fiber inexpensively in homes of offices. The inexpensive structure or the optical fiber network leads to creation of new businesses in the field of utilization of advanced household electrical appliances.

In transmitting signals using an optical fiber, there are known two methods, namely a bi-core type bidirectional optical communication employing two optical fibers, and a bidirectional optical communication employing a sole optical fiber.

In the bi-core type bidirectional optical communication, one of the optical fibers is used for transmission, with the outer being used for reception. On the other hand, the uni-core type bidirectional optical communication uses a sole optical fiber to effect signal transmission/reception, so that the optical fiber cost in constructing the network is one-half that for the bi-core system. Also, with the bi-core system, the two fibers are intended for separate purposes, that is for transmission and for reception, thus leading to directive coupling between the light transmission/reception apparatus and the optical fibers.

The optical fiber is connected to an optical fiber connecting portion provided in the optical transmission/reception apparatus. The optical fiber connection portion of the optical transmission/reception apparatus of the bi-core system is divided into a transmitting side connecting portion for transmitting optical signals and a reception side connecting portion receiving optical signals. Thus, in transmitting/receiving optical signals, the optical signal flowing direction through each optical fiber is necessarily unidirectional. That is, in the optical fiber network, performing optical communication between the first and second optical transmission/reception devices the transmitting side connecting portion of the first optical transmission/reception device needs to be connected by an optical fiber to the receiving side connecting portion of the second optical transmission/reception device. Similarly, the receiving side connecting portion of the first optical transmission/reception device needs to be connected by an optical fiber to the transmitting side connecting portion of the second optical transmission/reception device. If the bi-core system is used, the optical fibers need to be connected in association with respective connecting portions.

On the other hand, the uni-core type bidirectional optical communication is superior in system construction since it does not suffer the aforementioned problem of directivity to assure facilitated connection of the first and second optical transmission/reception devices to the optical fiber connecting portions.

The uni-core bidirectional optical communication recently is stirring up notice in that the amount of the optical fibers used can be decreased and connection to optical fibers is facilitated.

Meanwhile, the uni-core type bidirectional optical communication suffers from the problem of so-called cross-talk.

The cross-talk means the problem that optical signals from a sending party become mixed into optical signals from the optical signal transmission/reception device connected to the sending device over an optical fiber. Among the factors contributing to the cross-talk is a mechanism in which the light transmitted by the sending party is reflected by the remote end of the optical fiber connected to the other optical fiber to prove the remote-end-reflected light which then falls on the light receiving section of the sending device. The reflection at the remote end of the optical fiber, termed Fresnel reflection, is brought about by the properties of light that it is reflected by an interface between two mediums of different refractive indices.

In general, the optical fibers suffers losses, such that, if optical signals are transmitted over an optical fiber, the optical signals are decreased in amplitude. That is, loss in light volume is produced by optical fiber transmission. Therefore, if the optical fiber is of an increased length, the light reflected on the remote end is of a reduced light quantity, due to optical fiber loss, when it returns to the light receiving portion of the own device, thus the effect of the optical crosstalk being reduced. However, if the optical fiber is of an decreased length loss in the light volume by optical fiber transmission is only small, thus increasing the effect of cross-talk by the reflected light from the light receiving portion.

In particular, if a first light transmission/reception device 201 is interconnected to a second light transmission/reception device 202 over a short optical fiber 203 and a long optical fiber 204, coupled together, remote end reflection poses a serious problem. In the structure shown in FIG. 1, the optical fibers 203, 204 are coupled to each other by a connector 205. By using the connector 205, made up of a first connecting member 206 and a second connecting member 207, detachably connected to each other, the first connecting member 206, provided in the vicinity of an end face of the optical fiber 203, and the second connecting member 207, provided in the vicinity of an end face of the optical fiber 204, are connected to each other to connect the end face of the optical fiber 203 to the end face of the optical fiber 204.

Referring to FIG. 2, the amplitude attenuation in the optical signals transmitted over the optical fibers 203, 204 interconnected by the connecting portion 208 is explained.

Referring to FIG. 2A, light S transmitted from the first light transmission/reception device 201 is reflected by the connecting portion 208 on the end face of the optical fiber so as to fall as remote end reflected light FX on the first light transmission/reception device 201. For example, the remote end reflected light Fx falls with an amplitude BFX on the first light transmission/reception device 201.

On the other hand, in FIG. 2B, the first light transmission/reception device 201 receives light D of an amplitude BD sent over optical fibers 203, 204 from the second light transmission/reception device 202.

It is noted that arrows A in FIGS. 2A and 2B indicate the direction in which occurs the loss in the optical fiber.

If, for example, the amplitude BFX of the remote-end-reflected light FX is close to the amplitude BD of the received light D, the first light transmission/reception device 201 cannot distinguish the remote-end-reflected light FX from the received light D sent from the second light transmission/reception device 202, thus producing the aforementioned problem of cross-talk.

As a matter of course, the amplitude of the optical signals and the remote-end-reflected light depends on the length of the optical fiber, the number of optical fibers to be interconnected, and on the light emission intensity of the optical transmission/reception apparatus. This poses a serious problem for the light transmission/reception apparatus of the uni-core bidirectional system in an optical fiber network constructed by optical fibers of variable lengths.

As a pertinent technique of prohibiting Fresnel reflection on the connecting portion 208, there is known such a method in which an end face 213a of an optical fiber 213 and an end face 214a of an optical fiber 214 are polished to round shape to high precision to abut the cores against each other, as shown in FIG. 3.

In this method, the end faces 213a, 214a of the optical fibers 213, 214 are interconnected by the connector 215. Specifically, a first connecting member 216 is mounted in the vicinity of the end face 213a of the optical fiber 213, a second connecting member 217 is mounted in the vicinity of the end face 214a of the optical fiber 214 and the connecting members 216, 217 are fitted to a substantially annular fitting member 218 to interconnect the optical fibers 213, 214.

This method has, however, a drawback that the end faces need to be machined to high precision, thus increasing the cost. There are also problems that the connection becomes invalid if an air layer is interposed between the optical fiber 213, 214, and that, if vibrations are applied to the optical fibers 213, 214, the end faces 213a, 214a rub against each other to produce scratches. If scratches are produced due to rubbing, transmission of the signal light becomes impossible in the worst case.

FIG. 4 shows a method of interconnection of optical fibers in which an optical adhesive 222 is used to prevent remote end reflection from occurring. In this method, a first connecting member 226 is mounted in the vicinity of an end face 223a of the optical fiber 223, whilst a second connecting member 227 is mounted in the vicinity of an end face 224a of the optical fiber 224, these connecting members 226,227 being fitted to the ring-shaped fitting member 228. The end face 223a of the optical fiber 223 is bonded to the end face 224a of the optical fiber 224 by the optical adhesive 222 having a refractive index close to that of the cores 223b, 224b of the optical fibers 223, 224, thereby prohibiting the reflection from the remote end. However, since the optical fibers are bonded to each other, difficulties are met in re-dismounting the optical fibers. Meanwhile, the diameters of the core 223b, 224b of the optical fibers of quartz 223, 224 are approximately 5 μm in diameter, with the diameters thereof inclusive of clad layers 223c, 224c being approximately 125 μm.

SUMMARY OF THE INVENTION

It is therefore an object of the present invention to provide optical fiber connecting method and apparatus in which optical cross-talk is prevented from occurring to assure optical communication in accordance with the uni-core bidirectional system.

In one aspect, the present invention provides an optical fiber connector for interconnecting a first optical fiber and a second optical fiber including refractive index matching means having a refractive index subsequently equivalent to that of cores of first and second optical fibers, and optical fiber connecting means for interconnecting the first and second optical fibers in a state in which end faces of first and second optical fibers are contacted with refractive index matching means interposed between first and second optical fibers.

In another aspect, the present invention provides a network system for interconnecting a plurality of electronic equipments including a first electronic equipment including a first optical communication circuit, an optical fiber connector, a first fiber for interconnecting first optical communication circuit and optical fiber connector, a second electronic equipment having a second optical communication circuit and a second optical fiber for interconnecting the optical fiber connector of first electronic equipment and second optical communication circuit of second electronic equipment. The optical fiber connector of first electronic equipment includes refractive index matching means having a refractive index substantially equivalent to that of cores of first and second optical fibers and optical fiber connecting means for interconnecting first and second optical fibers in a state in which end faces of first and second optical fibers are contacted with refractive index matching means interposed between first and second optical fibers.

In still another aspect, the present invention provides a electronic equipment having an optical communication circuit. The electronic equipment includes an optical fiber connector, and an optical fiber for interconnecting optical communication circuit and optical fiber connector. The optical fiber connector includes refractive index matching means, at an end of optical fiber, having a refractive index substantially equivalent to that of cores of first and second optical fibers, and optical fiber connecting means for interconnecting optical fiber and another optical fiber in a state in which end faces of optical fibers are contacted with refractive index matching means interposed between optical fibers.

In yet another aspect, the present invention provides a method for interconnecting a first optical fiber and a second optical fiber. The method includes a step of interposing refractive index matching means having a refractive index substantially equivalent to that of cores of first and second optical fibers between an end face of first optical fiber and an end face of second optical fiber, and a step of interconnecting first and second optical fibers in a state in which end faces of first and second optical fibers are contacted with refractive index matching means.

In the optical fiber connecting apparatus, according to the present invention, the end faces of the two optical fibers are interconnected in a state in which the end faces are contacted with refractive index matching means interposed therebetween.

That is, with the optical fiber connecting apparatus, the optical fiber connector interconnects the optical fibers in a state in which the end faces are contacted with the refractive index matching means.

In this manner, with the optical fiber connecting apparatus, product costs can be lowered without the necessity of observing machining accuracy in polishing the end faces of the optical fibers, while optical signals can be transmitted in a manner suited for optical communication, with the optical fibers being interconnected and detached from each other as desired.

In the optical fiber connecting method, according to the present invention, the end faces of the two optical fibers are interconnected in a state in which the end faces are contacted with refractive index matching means interposed therebetween.

That is, with the optical fiber connecting method, the optical fiber connector interconnects the optical fibers in a state in which the end faces are contacted with the refractive index matching means.

In this manner, with the optical fiber connecting method, product costs can be lowered without the necessity of observing machining accuracy in polishing the end faces of the optical fibers, while optical signals can be transmitted in a manner suited for optical communication, with the optical fibers being interconnected and detached from each other as desired.

DESCRIPTION OF THE PREFERRED EMBODIMENTS

Figure 1:
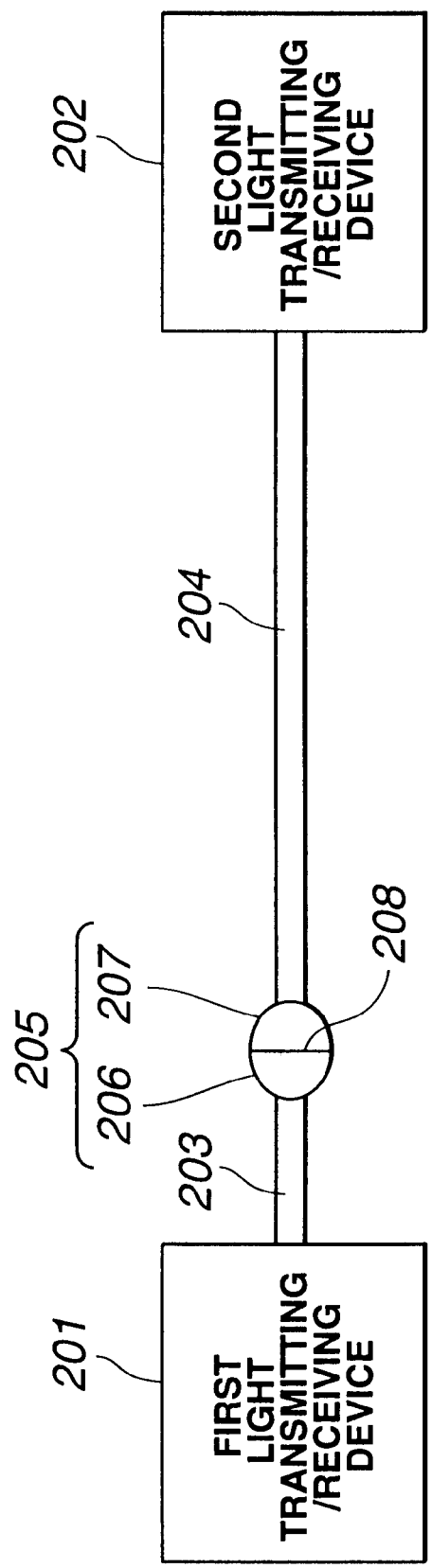
FIG. 1 is a side view showing the state in which optical fibers are interconnected by associated connectors for optical fibers.

Referring to the drawings, preferred embodiments of according to the present invention will be explained in detail. The embodiment now explained represents a preferred form of execution of the present invention and hence is accompanied by many technically desirable limitations. However, the present invention is not limited to the embodiment illustrated unless there is made any statement to the contrary.

The optical fiber connector of the present embodiment is used for making series connection of two optical fibers connected to an optical circuit. The optical fibers connected in the up-direction to the optical fiber connector is a so-called plastic optical fiber formed of a plastic material.

Figure 5:
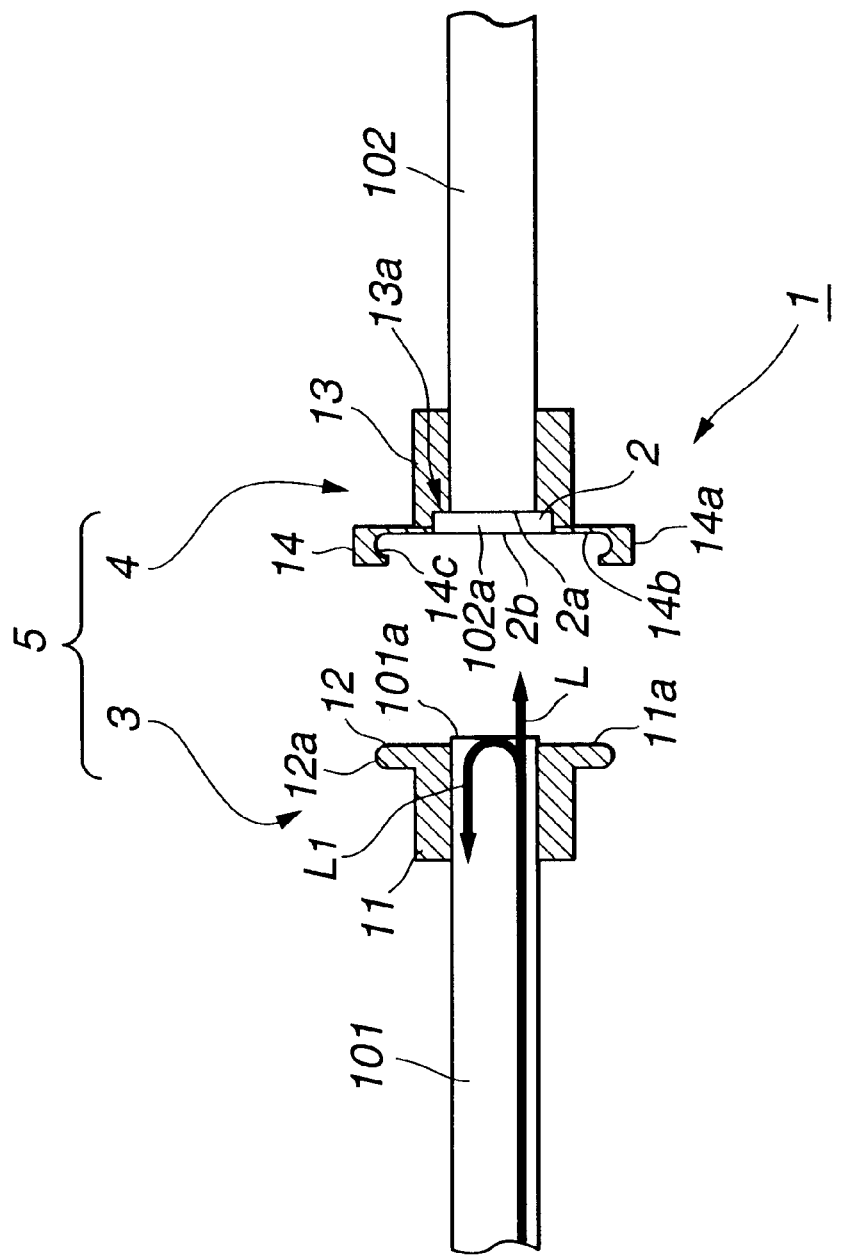
FIG. 5 is a cross-sectional view of the structure of an optical fiber connector according to the present invention, for showing the state in which the first connecting member is not connected to the second connecting member.
Figure 6:
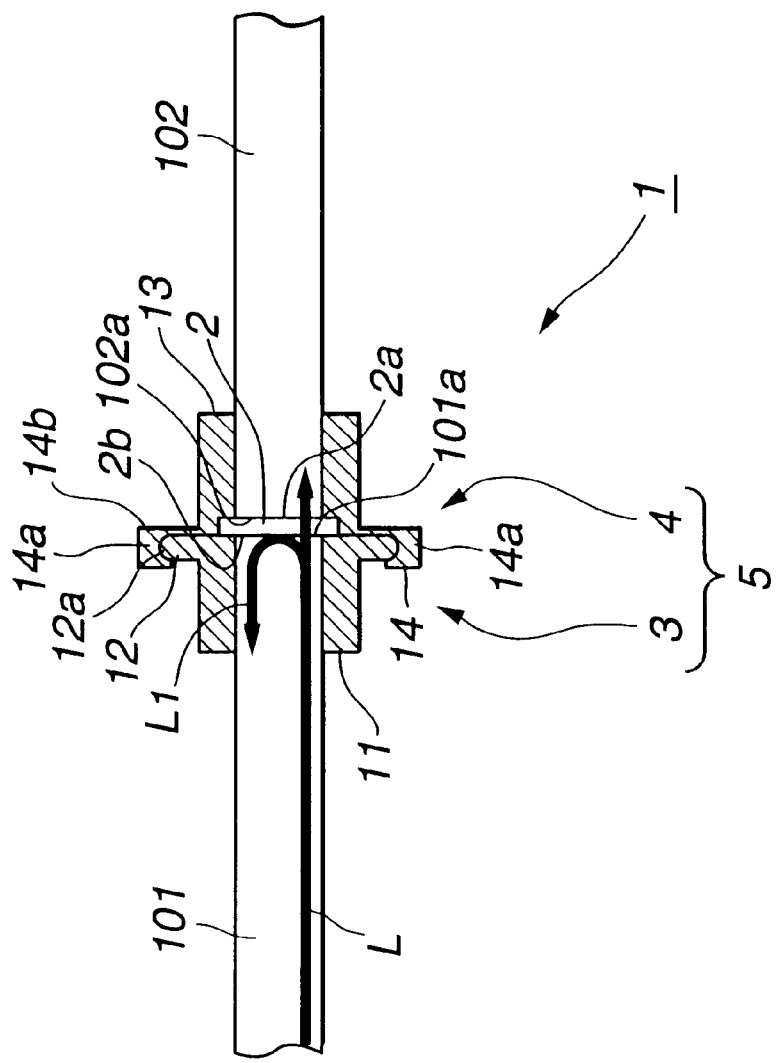
FIG. 6 is a cross-sectional view of the structure of an optical fiber connector according to the present invention, for showing the state in which the first connecting member is connected to the second connecting member.

Referring to FIGS. 5 and 6, an optical fiber connector 1 includes a refractive index matching member 2, having refractive index approximately equal to that of the cores of optical fibers 101, 102, and an optical fiber connecting portion 5 comprised of a first connecting member 3 and a second connecting member 4 interconnecting the optical fibers 101, 102, with the refractive index matching member 2 interposed between end faces 101a, 102a of the two optical fibers, with the end faces 101a, 102a being in contact with the refractive index matching member 2.

The first connecting member 3 is shaped to be mounted on the optical fiber 101 and to have a fit on the second connecting member 4. Specifically, the first connecting member 3 is made up of a connecting portion 11, mounted in the vicinity of the end face 101a of the optical fiber 101, and a flange-shaped protrusion 12 fitted on the second connecting member 4.

The connecting portion 11 is substantially in the form of a cylindrical tube of an inner diameter substantially equal to the outer diameter of the optical fiber 101. The outer periphery of the distal end of the connecting portion 11 is provided with a flange-shaped protrusion 12.

The flange-shaped protrusion 12 is protruded from the outer periphery of the connecting portion 11 so as to have a fit on the second connecting member 4. Specifically, the flange-shaped protrusion 12, protruded from the outer periphery of the connecting portion 11, is of a substantially flat disc shape, and is connected as-one to the connecting portion 11.

The first connecting member 3, constructed as described above, is loaded in the vicinity of the end face 101a of the optical fiber 101. Specifically, the first connecting member 3 is connected in the vicinity of the end face 101a of the optical fiber 101 in such a manner that an end face 11 a thereof is receded slightly from the end face 101a of the optical fiber 101, that is that the end face 101a of the optical fiber 101 is protruded slightly, as shown in FIG. 5.

The second connecting member 4 is shaped so that the optical fiber 102 is loaded thereon and so that the first connecting member 3 has a fit thereon. Specifically, the second connecting member 4 is made up of a connecting portion 13 loaded in the vicinity of the end face 102a of the optical fiber 102 and a flange-shaped fitting portion 14 on which is fitted the flange-shaped protrusion 12 of the first connecting member 3.

The connecting portion 13 is in the shape of substantially a cylindrical tube having an inner diameter substantially equal to the outer diameter of the optical fiber 101. A flange-shaped fitting portion 14 is formed on the outer periphery of the distal end of the connecting portion 13. The connecting portion 13 has a mounting portion 13a on which to mount the refractive index matching member 2. The mounting portion 13a is formed as a shoulder in an inner rim of an end face of the connecting portion 13.

The flange-shaped fitting portion 14 is shaped to permit the first connecting member 3 to be fitted thereon. Specifically, the flange-shaped fitting portion 14 is formed as-one with the connecting portion 13 on its outer periphery with an engaging portion 14a.

The engaging portion 14a is formed on the outer periphery of a sidewall section 14b comprised of a substantially flat disc shape and is protruded forwards at right angles to the sidewall section 14b. In the inner peripheral portion of the engaging portion 14a is formed a groove 14c engaged with an engaging portion 12a of the flange-shaped protrusion 12. For example, the groove 14c is substantially in the shape of a recessed torus.

By having the engaging portion 12a of the first connecting member 3 formed substantially as a convex torus and by having the groove 14c of the second connecting member 4 formed substantially as a recessed torus, the first connecting member 3 can be easily mounted on or dismounted from the second connecting member 4.

The refractive index matching member 2 has its surface 2a configured as a disc. The refractive index matching member 2 is formed of an elastic material having a refractive index substantially equal to that of the cores of the optical fibers 101, 102. Specifically, the refractive index matching member 2 is formed of silicone.

The refractive index matching member 2 has the first surface 2a as a surface to which is connected the end face 102a of the optical fiber 102 loaded on the second connecting member 4. The refractive index matching member 2 also has a second surface 2b facing the first surface 2a and to which is connected the end face 101a of the optical fiber 101 in the interconnected state of the first connecting member 3 and the second connecting member 4. The refractive index matching member 2 is mounted on the mounting portion 13a of the connecting portion 13.

With the above-described optical fiber connector 1, the first connecting member 3 is connected to the second connecting member 4 to connect the end faces 101a, 102a of the optical fibers 101, 102, loaded on the connecting members 3,4, to the refractive index matching member 2, with the end face 101a facing the end face 102a. Since the refractive index matching member 2 has the refractive index equal to that of the optical fibers 101, 102, it is possible to suppress Fresnel reflection on the end faces 101a, 102a of the optical fibers 101, 102.

Figure 7:
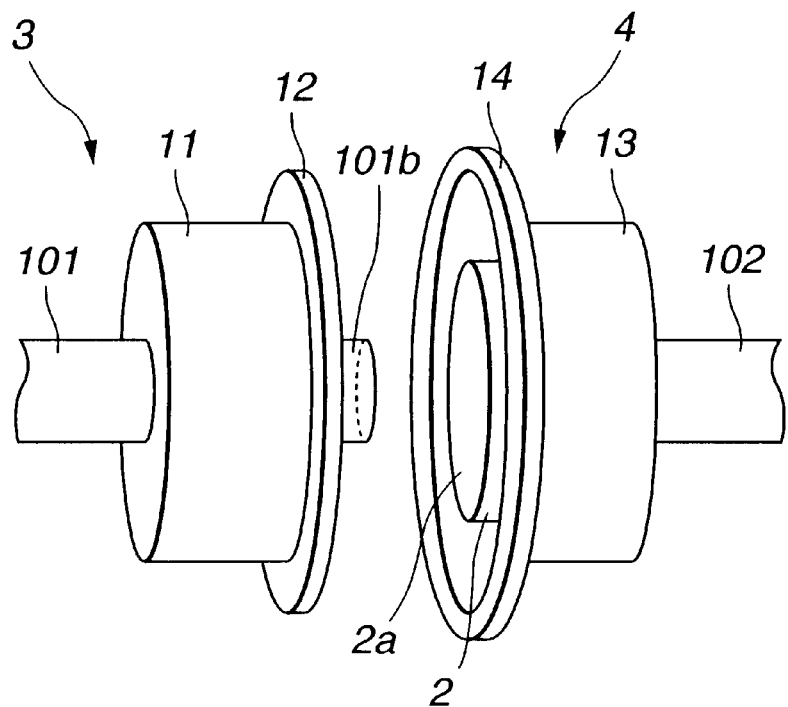
FIG. 7 is a perspective view of an optical fiber connector, showing details of the state in which the first connecting member is not connected to the second connecting member.
Figure 8:
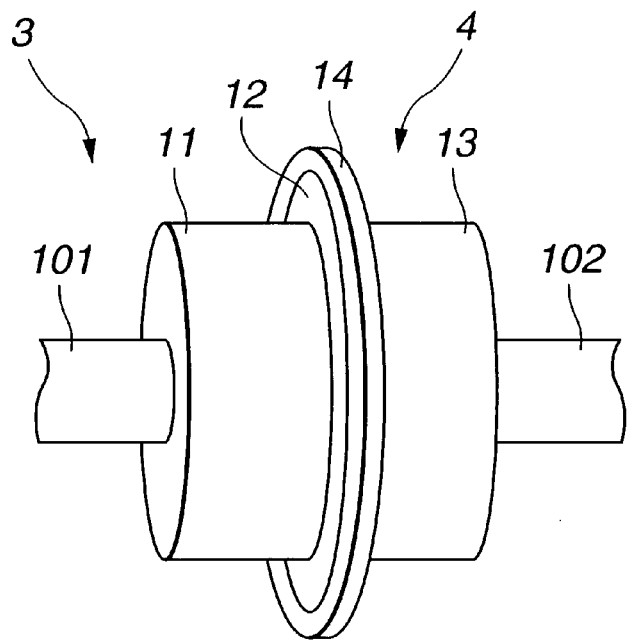
FIG. 8 is a perspective view of an optical fiber connector, showing details of the state in which the first connecting member is connected to the second connecting member.

The end face 101a of the optical fiber 101 is protruded from the end face 11a of the first connecting member 3, so that, when the first connecting member 3 is connected to the second connecting member 4, and the engaging portion 12a of the first connecting member 3 is retained by the engaging portion 14a of the second connecting member 4, the faces 2a, 2b of the refractive index matching member 2 tend to be abutted against the end faces 101a, 102a of the optical fibers 101, 102, under the force of elasticity of the refractive index matching member 2. That is, by protruding the forward end 101b of the optical fiber 101 from the end face of the first connecting member 3, as shown in FIGS. 7 and 8, the adhesion between the forward ends 101a, 102a of the optical fibers 101, 102 and the end faces 2b, 2a of the refractive index matching member 2 is increased. Since the first connecting member 3 and the second connecting member 4 of the optical fiber connector 1 are detachable from each other, it is possible to connect or detach the optical fibers 101, 102 to or from each other as desired.

Thus, there is not laid a requirement for polishing the end faces of the optical fibers to round shape to high precision, thus allowing to decrease the cost.

If the refractive index matching member 2 is interposed between the end faces 101a, 102a of the optical fibers 101, 102, it is possible to prevent an air layer from being interposed between the end faces 101a, 102a of the optical fibers 101, 102 by improving contact tightness.

Since the end faces of the optical fibers are not bonded, it is possible to connect or detach the optical fibers relative to each other in a desired manner. By providing the first connecting member 3 with the flange-shaped protrusion 12 and by providing the second connecting member 4 with the flange-shaped fitting portion 14, as described above, the first connecting member 3 can be detachably fitted relative to the second connecting member 4.

At least the flange-shaped protrusion 12 in the first connecting member 3 and at least the flange-shaped fitting portion 14 in the second connecting member 4 may be formed of an elastic material. By so doing, the first connecting member 3 and the second connecting member 4 can be easily connected or detached relative to each other.

The flange-shaped protrusion 12 need not be formed as-one with the connecting portion 11, whilst the flange-shaped fitting portion 14 need not be formed as-one with the connecting portion 13. That is, the flange-shaped protrusion 12 and the flange-shaped fitting portion 14 may be formed as separate members from the connecting portions.

The meritorious effect of the use of the refractive index matching member 2 is hereinafter explained. In general, light is reflected on an interface between two mediums having different refractive index values. The reflectance R is given by the following equation:

$$R = \left(\frac{n_2 - n_1}{n_2 + n_1}\right)^2 \tag{1}$$

where n1 and n2 denote the refractive index of the medium through which light travels before falling on the interface and that of the medium through which light travels after transmission through the interface, respectively. For example, if, in FIG. 5 showing the state in which the end face 101a of the optical fiber 101 is not contacting with any object, the signal light L exits the optical fiber 101, the refractive index n1 and the refractive index n2 represent the refractive indices of the core of the optical fiber 101 and the air, respectively. For example, if an optical fiber of plastics is used, it is known that the core has a reflectance n1=1.492 approximately. Thus, if the equation (1) is used, the reflectance is 3.9%. The light L1 reflected by the end face of the optical fiber 101 at this time represents the cross-talk.

However, if the end face 101a of the optical fiber 101 and the end face 102a of the optical fiber 102 are arranged on both sides of the refractive index matching member 2, and the signal light L is emitted from the optical fiber 101, the reflectance R on the end face 101a is given by the following equation (2):

$$R = \left(\frac{n_3 - n_1}{n_3 + n_1}\right)^2 \quad (2)$$

where n3 denotes the refractive index of the refractive index matching member 2.

It is seen from this equation (2) that the closer the refractive index n3 of the refractive index matching member 2 to the refractive index n1 of the core of the optical fiber 101, the smaller is the reflectance. For example, the reflectance can be reduced to 0.01% by using silicone having a refractive index to the light with a wavelength of 650 nm of 1.52 as a material of the refractive index matching member 2, and by tightly contacting the end face 101a of the optical fiber 101 with the refractive index matching member 2 to eliminate an air layer between the end face 101a and the surface 2b of the refractive index matching member 2. Similarly, the Fresnel reflection on the interface between the end face 102a and the air can be reduced by tightly contacting the end face 102a of the optical fiber 102 with the refractive index matching member 2. The reduction in the Fresnel reflection leads not only to reduced crosstalk but also to improved coupling efficiency between the optical fibers 101 and 102.

Figures 2A, 2B:
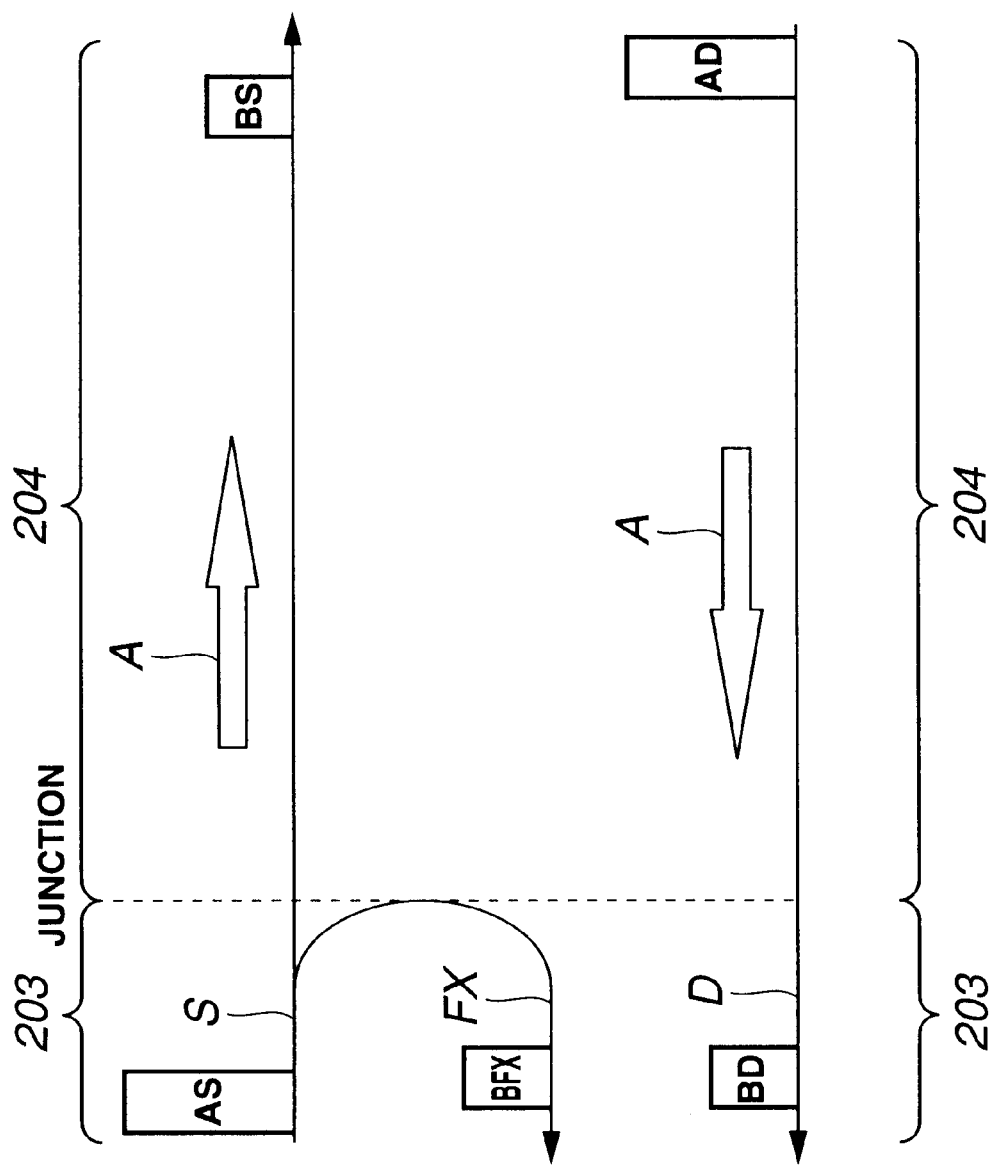
FIGS. 2A and 2B illustrate the problem of crosstalk produced in an optical fiber interconnected by associated connectors for optical fibers.
Figure 3:
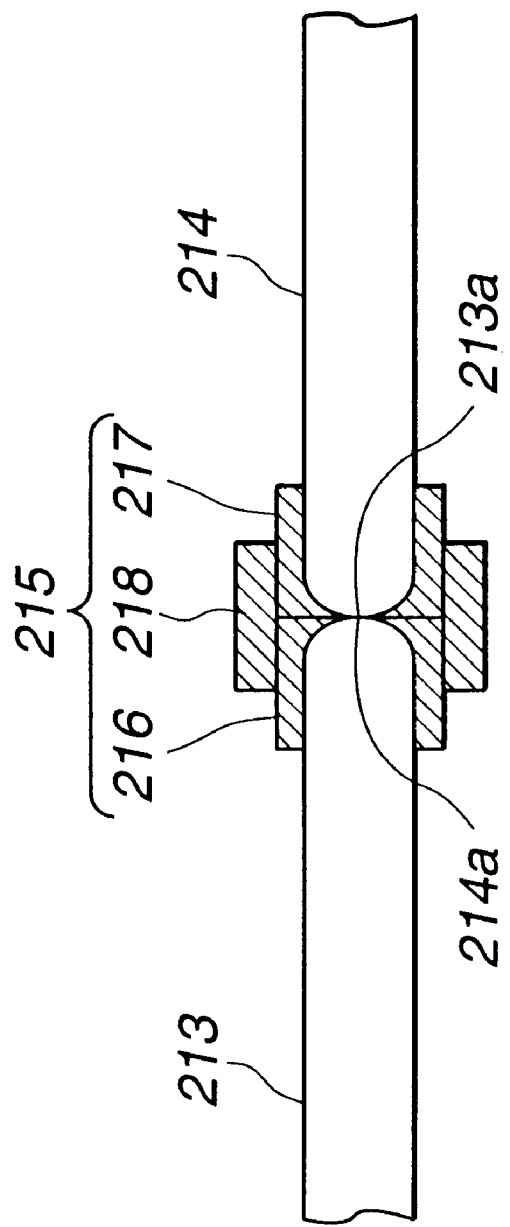
FIG. 3 is a cross-sectional view showing a conventional optical fiber connector adapted for inhibiting Fresnel reflection.
Figure 4:
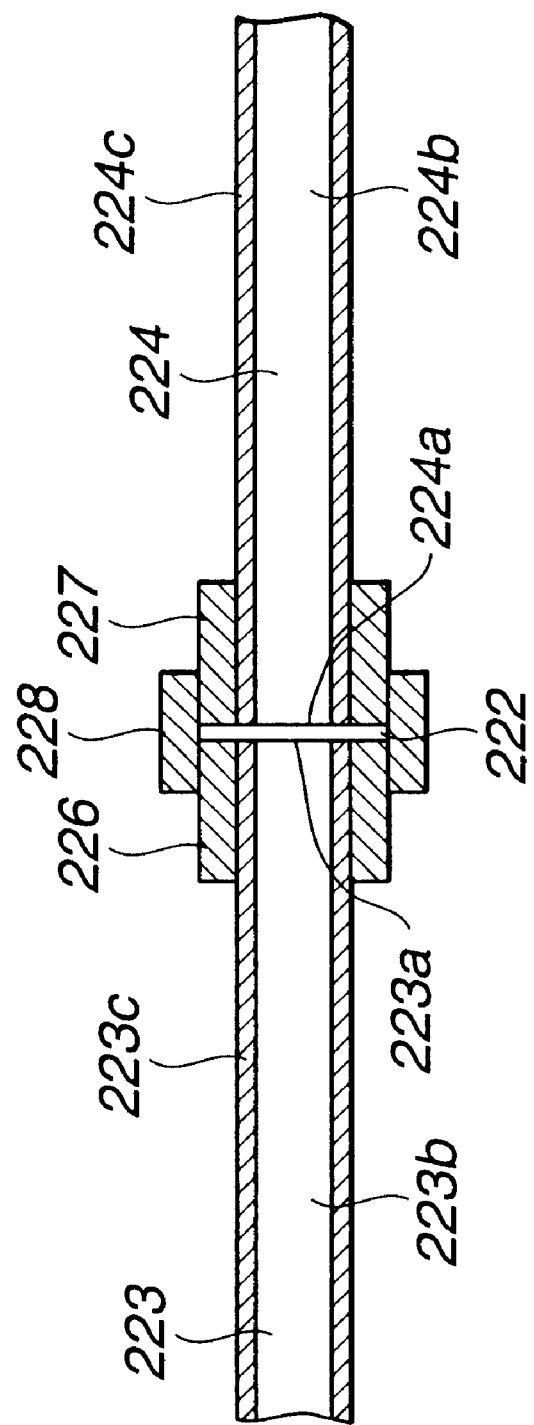
FIG. 4 is a cross-sectional view showing a conventional optical fiber connector adapted for interconnecting optical fibers by preventing remote end reflection by an optical adhesive for inhibiting Fresnel reflection

The condition for the reflectance R in the above equation (2) in order for the optical communication circuit to exhibit the required performance with the uni-core bidirectional system is explained with reference to FIGS. 1 and 2. It is assumed that, in order for the optical communication circuit to manifest a sufficient performance, the ratio the amplitude BD of the received light to the amplitude BFX of the remote-end-reflected light is required to be in excess of a certain value OSN, as indicated by the equation (3):

$$\frac{BD}{BFX} \geq OSN. \quad (3)$$

It is assumed that the length of an optical fiber 203 connected to the first light transmission/reception device 201 is LE1 and that of an optical fiber 204 connected to the second light transmission/reception device 202 is LE2, the transmission loss of the optical fiber 203 per length LE1 is display d1, and that of the optical fiber 204 per length LE2 is d2. With the use of the equation (2) for the reflectance R of the optical fiber for the refractive index matching member 2, the equation (3) can be rewritten to the following equation (4):

$$\frac{(1-R)^2 d_2}{R d_1} \geq OSN. \quad (4)$$

By employing the refractive index matching member 2, having the reflectance R satisfying the equation (4), it is possible to have communication by optical signals with the performance required by the optical communication circuit.

The measured results for evaluating the meritorious effect by the optical fiber connector 1 are hereinafter explained.

Figure 9:
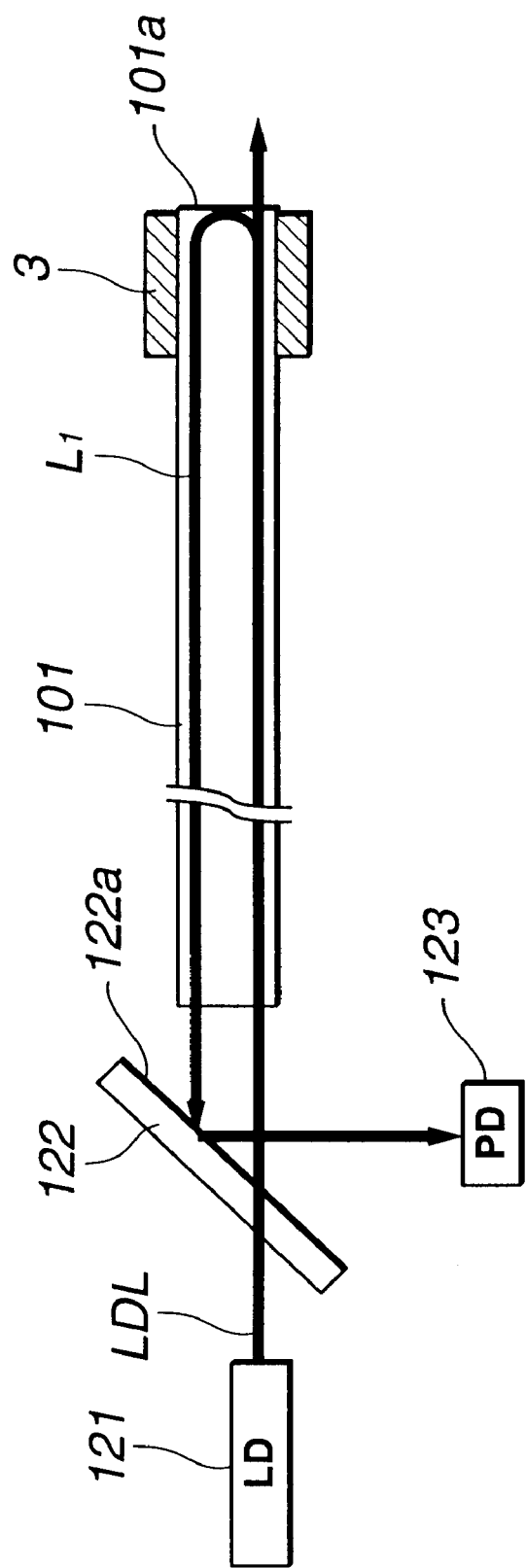
FIG. 9 shows an experimentation system constructed for evaluating the effect achieved by an optical fiber connector for comparison sake.

In an experimentation system, shown in FIG. 9, the end face 101a of the optical fiber 1 is opened to face the outside, so that it is contacted with air.

Figure 10:
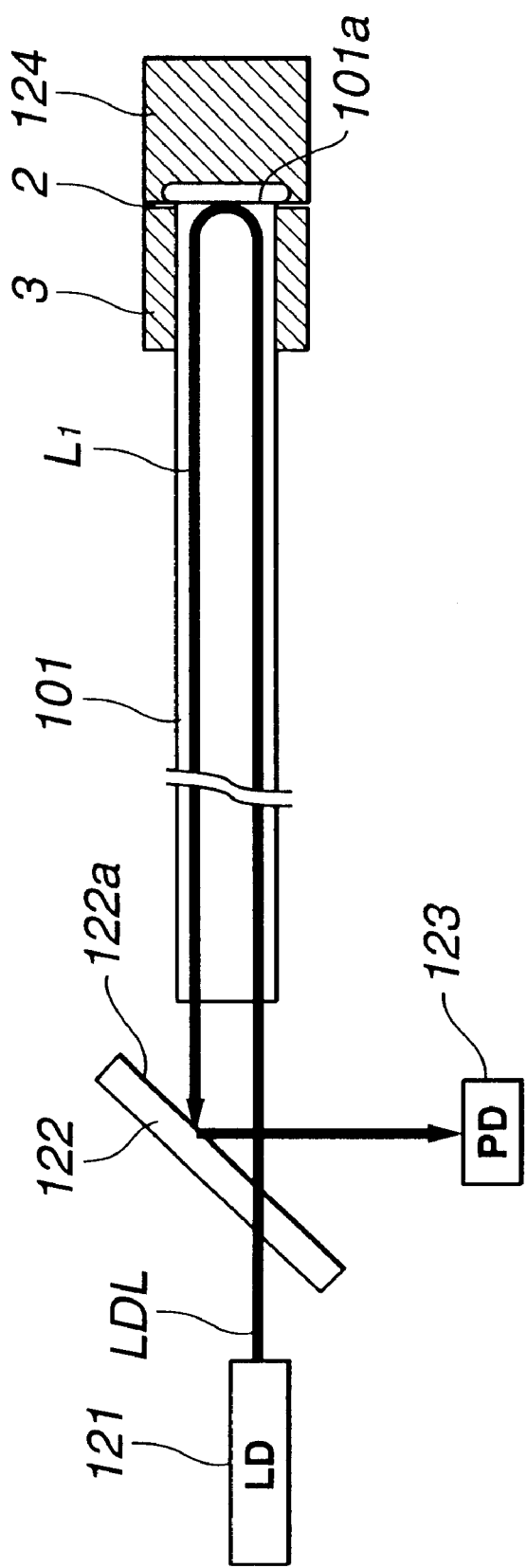
FIG. 10 shows an experimentation system employing the structure of the optical fiber connector, constructed for evaluating the effect achieved by an optical fiber connector

In the experimentation system, shown in FIG. 10, for the optical fiber connector 1, the end face 101a of the optical fiber 101 is tightly contacted with the refractive index matching member 2. In the experimentation system, shown in FIG. 10, an optical absorber 124 is bonded to the back side of the refractive index matching member 2 to which is not bonded the end face 101a of the optical fiber 101. The refractive index matching member 2 is formed of silicone. For example, the commercially available silicone with a refractive index of 1.52, a tensile strength of 2 kgf/cm² and an elongation of 50% may be used. The tensile strength denotes the rubber characteristics as defined by the JIS K 6250 measurement method. The elongation denotes the length elongated on the occasion of the tensile strength test. The elongation of 50% indicates that the sample length has been extended in an amount of 50% of the initial length. The refractive index matching member 2, formed of silicone having these characteristics, has pliability sufficient for the refractive index matching member 2 to be deformed into tight contact with the end faces 101a, 101b of the optical fibers 101, 102. If the mounting or dismounting with respect to the optical fibers is repeated, the optical fibers suffer no change in refractive index characteristics.

Figure 11:
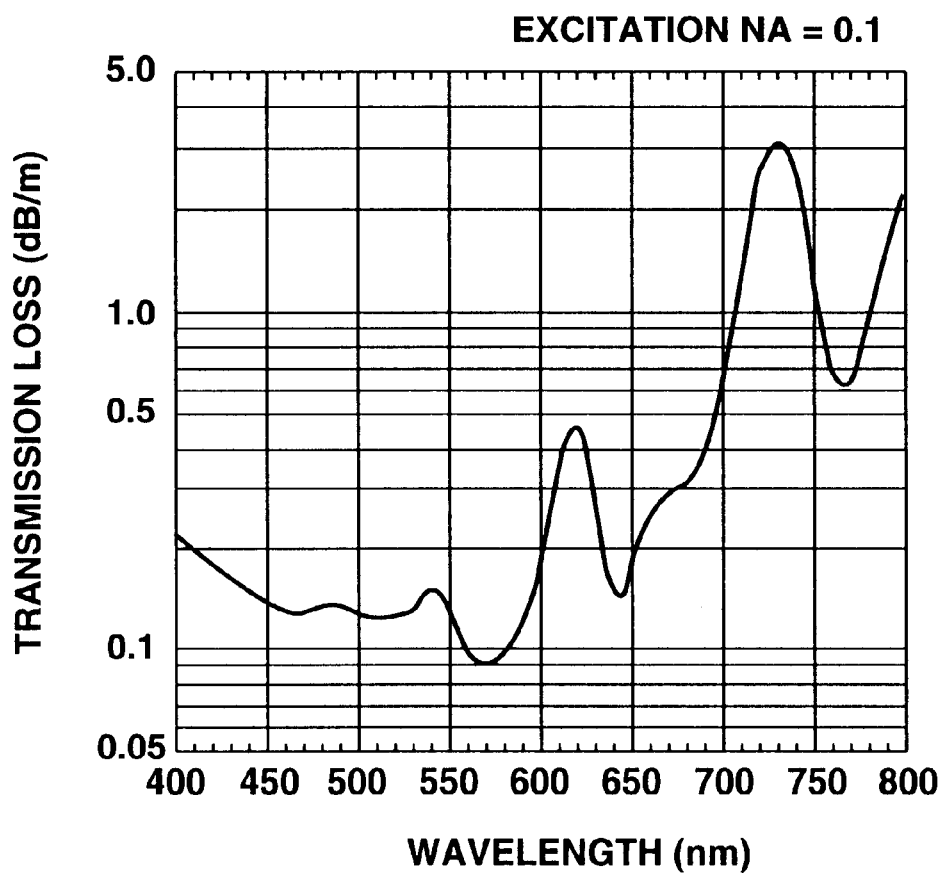
FIG. 11 is a graph showing characteristics of optical fiber loss spectrum.

The two experimentation systems are provided with a laser diode (LD) 121 as a light source and a beam splitter (BS) 122 for reflecting the light reflected by the end face 101a of the optical fiber 101 to a light-receiving element (Photo Diode), as shown in FIGS. 9 and 10. For example, the laser diode 121 exits the light with an oscillation wavelength of 650 nm. The optical fiber 101 used for measurement is formed of plastics and has characteristics shown in Table 1 and the loss spectrum shown in FIG. 11.

TABLE 1

| outer diameter of optical fiber | 1000 μm |
|---|---|
| outer shape of coating | 2.2 mm |
| material type of coating | polyethylene |
| transmission loss | 14 dB/100 m* |
| band | 160 MHz@100 m* |
| refractive index | |
| core | 1.492 |
| cladding | 1.456 |

*reference value for 650 nm monochomatic collimated light

In the above-described experimentation system, the outgoing light LDL from the laser diode 121 is transmitted through the beam splitter 122 to fall on the optical fiber 101. The light incident on the optical fiber 101 is reflected by the end face 101a of the optical fiber 101 and thence proceeds as the reflected light L1 towards a reflecting surface 122a of abeam splitter (BS) 122. The reflected light L1 is reflected by the reflecting surface 122a of the beam splitter 122 to fall on a light receiving element 123.

In the above experimentation system, in which the end face 101a of the optical fiber 101 is in contact with air, the volume of light received by the light receiving element 123 was 23.8 μW. On the other hand, in the experimentation system, shown in FIG. 10, in which the refractive index matching member 2 is tightly contacted with the end face 101a of the optical fiber 101, the volume of light received by the light receiving element 123 is 10.7 μW which is smaller than that when the end face 101a is in contact with air. Thus, in the measurement for evaluating the effect proper to the optical fiber connector 1, obtained with the experimentation system shown in FIGS. 9 and 10, the meritorious effect of the refractive index matching member 2 is explicit.

Figure 12:
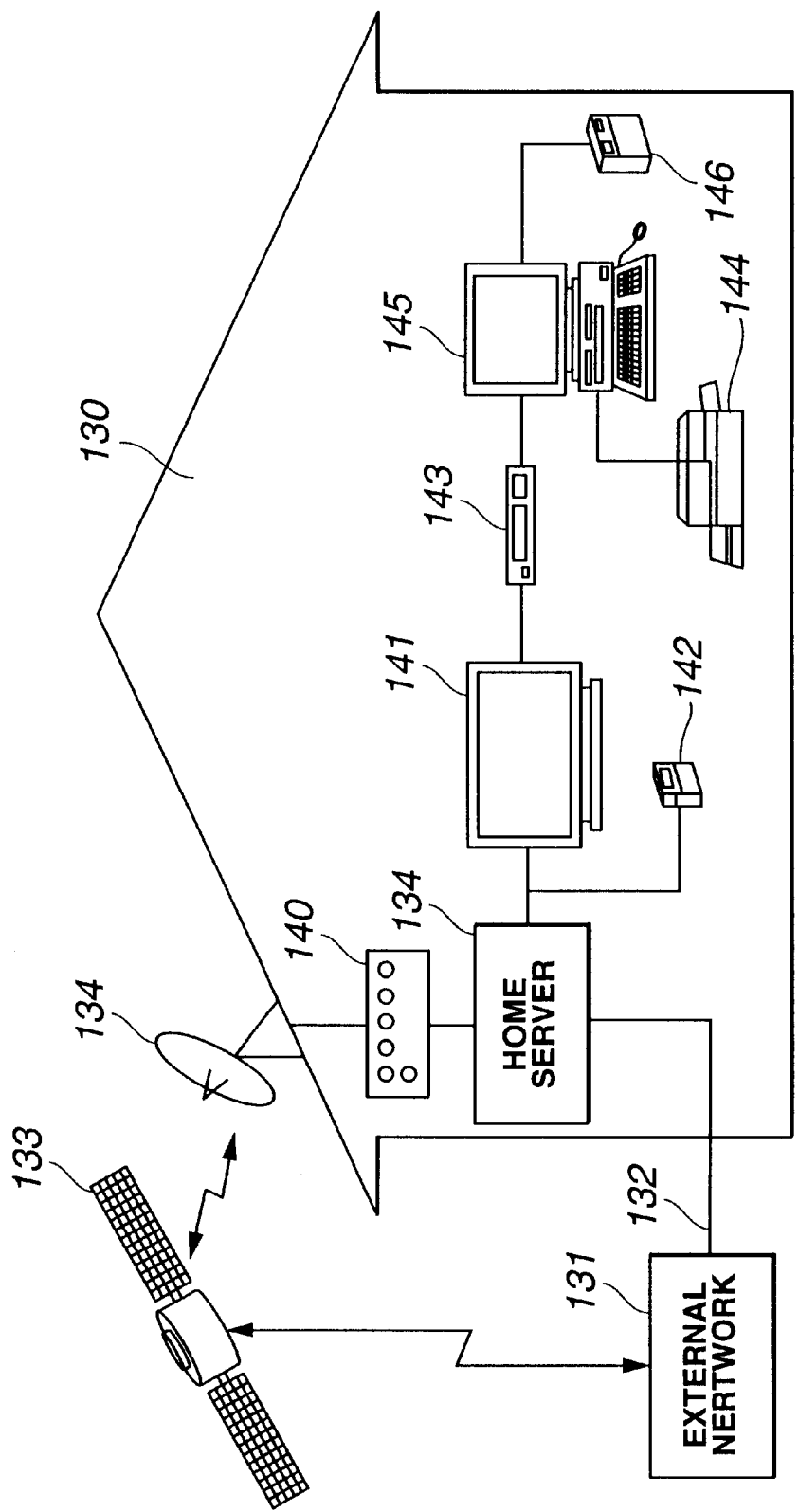
FIG. 12 shows a household network constructed by coupling optical fibers by optical fiber connectors.

For example, the present optical fiber connector 1 is used for constructing a home network as shown in FIG. 12.

A house 130 is connected via a communication cable 132 or an artificial satellite 133 with an external network 131. In the house 130 are arranged electrical appliances, information equipments and so forth. A home server 134 serves for storing the information from the external network 131. The appliances or equipments in a home can have access to the home server 134 to download the latest information promptly. A set top box 140 serves for processing; the information received via an antenna 134 from an artificial satellite 133.

The equipments installed in the house 130 may be exemplified by a TV receiver 141, a video camera 142, a video recorder 143, a printer/facsimile 144, a computer 145, a digital still camera 146, and so forth.

Figure 13:
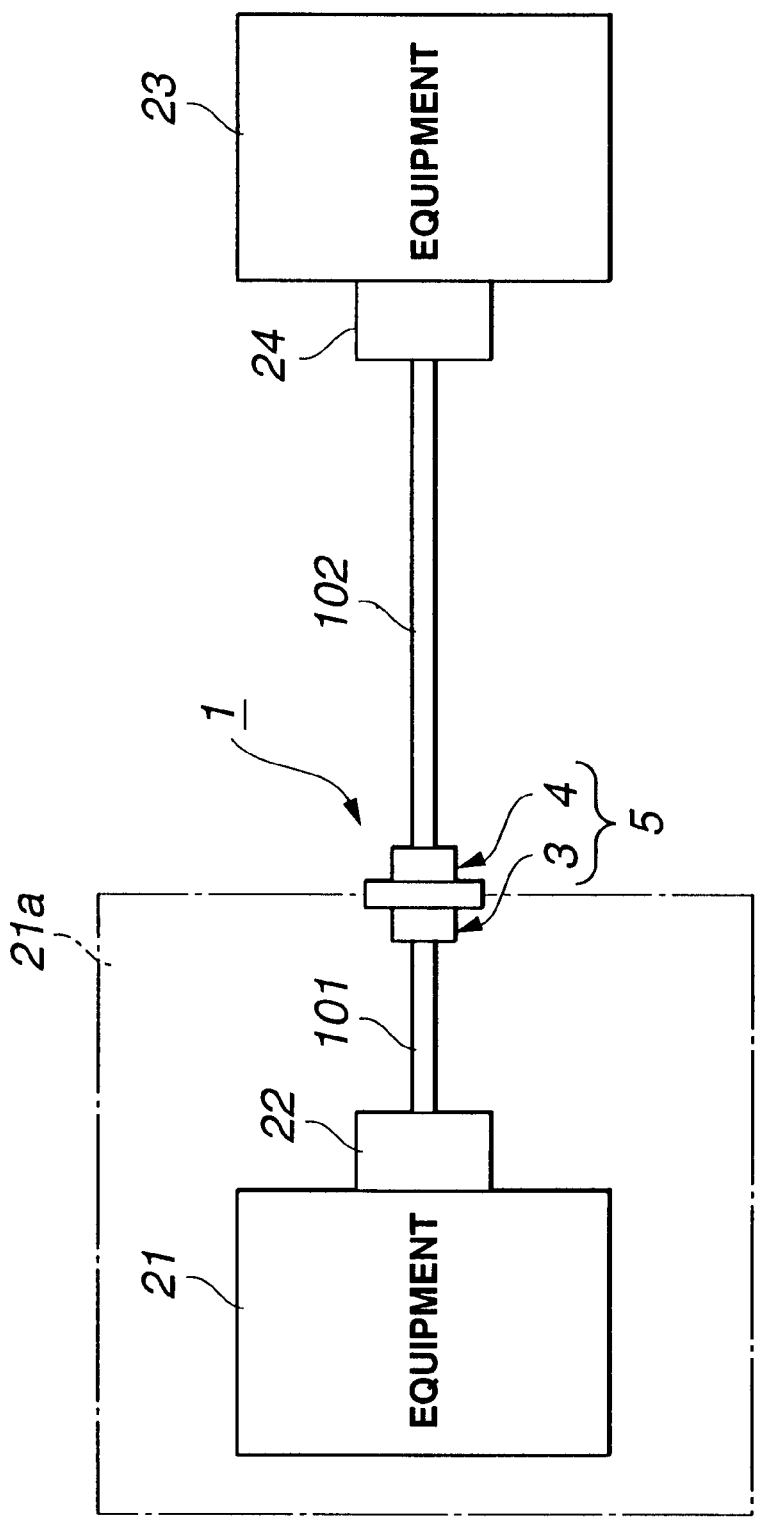
FIG. 13 is a side view showing an optical fiber connector used for interconnecting optical fibers for different equipments.

The optical fiber connector 1 can be used if the home network constructed by these plural electronic equipments is constructed by an optical fiber. In this case, the home network equipments can be connected to the home network via optical transmission/reception devices 22, 24 shown for example in FIG. 13 to construct the home network.

The optical transmission/reception devices 22,24 enable bidirectional optical communication between the equipments 21 and 23, and are used as a transmission channel for optical signals. The equipments 21 and 23 are the aforementioned electronic equipments or information equipments, such as the video recorder or a computer, as described above.

In general, the electronic equipments each include a transmission/reception device 22 in the inside of the casing 21*a* and a connecting portion on the outer surface of the casing 21*a* adapted to be connected to an optical fiber 102 of another equipment 23. That is, the optical fiber 102 extended from the equipment 23 as a counterpart of the optical communication is longer in length than the length of the optical fiber 101 extended in the inside of the casing 21*a* from the optical transmission/reception device 22 to the connecting portion of the casing 21*a*. The optical fiber connector 1 can be used in a connecting portion of the optical fiber arranged on an outer surface of the casing 21*a*.

In the prior art, if the distance from the optical transmission/reception device 22 to the remote end (end face 101*a*) of the optical fiber 101 is small, the effect of crosstalk is increased. By using the optical fiber connector 1, the reflection on the end face 101*a* of the optical fiber 101 is prohibited, so that crosstalk can be prohibited irrespective of the distance from the optical transmission/reception device 22 to the remote end of the optical fiber.

By using the optical fiber connector 1 in such home network, it is possible to prevent crosstalk between the variable equipment, such as electronic equipments making up the home network, to effect transmission/reception of optical signals.

Figure 14:
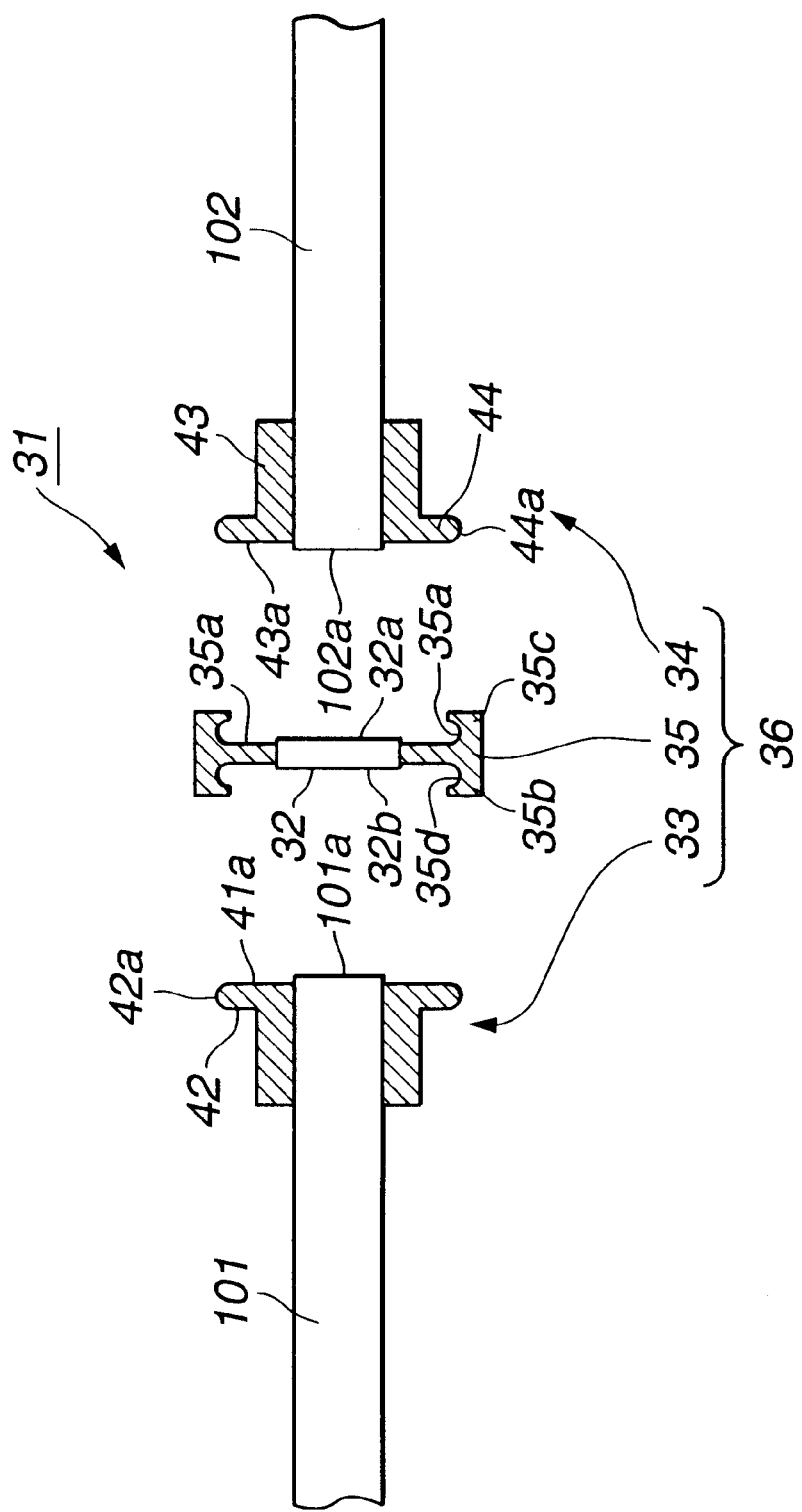
FIG. 14 is a cross-sectional view showing the structure of an optical fiber connector according to a modification of the present invention in which neither the first connecting member nor the second connecting member is connected to a third connecting member.
Figure 15:
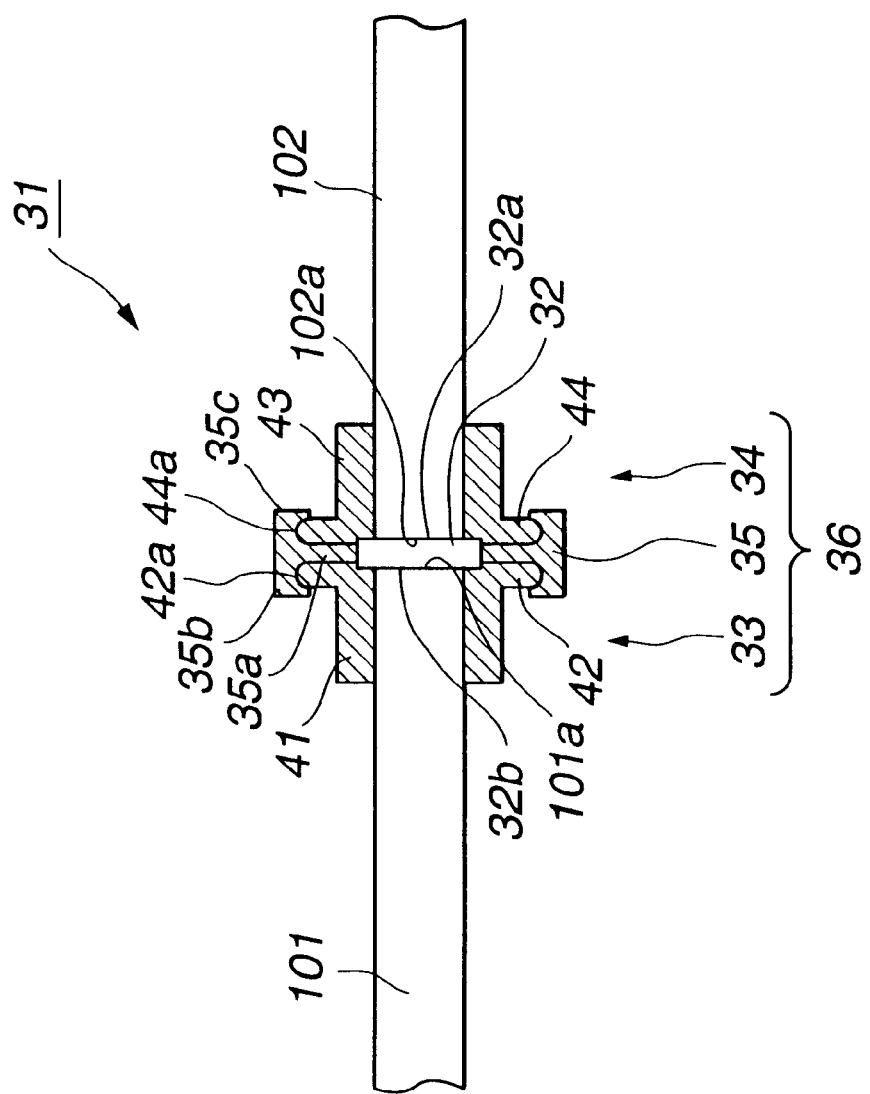
FIG. 15 is a cross-sectional view showing the structure of the optical fiber connector according to the modification of FIG. 14 in which the first and second connecting members are connected to the third connecting member.

In the above-described embodiment, the refractive index matching member 2 is built into the optical fiber connector 1. The present invention may, however, be applied to an embodiment in which the refractive index matching member 2 is designed as an independent member. If an optical fiber connector 31 is made up of a refractive index matching member 32 and an optical fiber connecting potion 36, made up of a first connecting member 33, a second connecting member 34 and a third connecting member 35, and which is adapted for arranging the end faces 101*a*, 102*a* of the optical fibers 101, 102 so as to face each other on either sides of the refractive index matching member 32 and for bringing the end faces 101*a*, 102*a* in this state into contact with the respective sides of the refractive index matching member 32, as shown in FIGS. 14 and 15, the refractive index matching member 32 can be made dismountable. The refractive index matching member 32 is formed of a material similar to that of the refractive index matching member 2.

The optical fiber connector 31 interconnects the optical fibers 101, 102 by fitting the first and second connecting members 33,34 to the third connecting member 35 carrying the refractive index matching member 32.

The first and second connecting members 33,34 are constructed similarly to the first connecting member 3 of the above-described optical fiber connector 1.

The first connecting member 33 is contoured so as to be loaded on the optical fiber 101 and so as to have a fit on the third connecting member 35. Specifically, the first connecting member 33 is made up of a connecting member 41, mounted in the vicinity of the end face 101*a* of the optical fiber 101 and a flange-shaped protrusion 42 fitted to the third connecting member 35.

The connecting member 41 is substantially in the shape of a cylindrical tube the inner diameter of which is substantially equal to the outer diameter of the optical fiber 101. On the outer periphery of the distal end of the connecting member 41 is formed the flange-shaped protrusion 42.

The flange-shaped protrusion 42 is protruded from the outer periphery of the connecting member 41 so as to have a fit on the third connecting member 35. Specifically, the flange-shaped protrusion 42, protruded from the outer periphery of the connecting member 41, is formed to a substantially flat disc and formed as-one with the connecting member 41.

The outer rim of the flange-shaped protrusion 42 is an engaging portion 42*a* engaged with the third connecting member 35. The outer rim of the flange-shaped protrusion 42 is formed to, for example, a substantially convexed torus shape.

Meanwhile, in the first connecting member 33, at least the flange-shaped protrusion 42 is formed of an elastic material. The flange-shaped protrusion 42 need not necessarily be formed as-one with the connecting member 41 since it may be constructed as a separate member from the connecting member 41.

The first connecting member 33, constructed as described above, is loaded in the vicinity of the end face 101*a* of the optical fiber 101 so that the end face 41*a* is slightly receded from the end face 101*a* of the optical fiber 101, that is so that the end face 101*a* of the optical fiber 101 is protruded from the end face 41*a*.

The second connecting member 34 is constructed to substantially the same shape as the first connecting member 33. That is, the second connecting member 34 is shaped so that it can be loaded on the optical fiber 102 and so that it will have a fit on the third connecting member 35. Specifically, the second connecting member 34 is made up of a connecting portion 43 and a flange-shaped protrusion 44 fitted to the third connecting member 35.

The connecting portion 43 is substantially in the shape of a cylindrical tube the inner diameter of which is substantially equal to the outer diameter of the optical fiber 102. On the outer periphery of the distal end of the connecting member 43 is formed a flange-shaped protrusion 4.

The flange-shaped protrusion 44 is protruded from the outer periphery of the connecting member 43 so as to have a fit on the third connecting member 35. Specifically, the flange-shaped protrusion 44, protruded from the outer periphery of the connecting member 43, is formed to a substantially flat disc and formed as-one with the connecting member 43.

The outer rim of the flange-shaped protrusion 43 is an engaging portion 44*a* adapted to be engaged with the third connecting member 35. The outer rim of the flange-shaped protrusion 44 is formed to, for example, a substantially convexed torus shape.

Meanwhile, in the second connecting member 34, at least the flange-shaped protrusion 44 is formed of an elastic material. The flange-shaped protrusion 44 need not necessarily be formed as-one with the connecting portion 43 since it may be constructed as a separate member from the connecting portion 43.

The second connecting member 34, constructed as described above, is loaded in the vicinity of the end face 102a of the optical fiber 102 so that the end face 43a is slightly receded from the end face 102a of the optical fiber 102, that is so that the end face 102a of the optical fiber 102 is protruded from the end face 102a.

The third connecting member 35, to which are fitted the first and second connecting members 33, 34, is provided with a mounting portion 35a, to which is fitted the refractive index matching member 32. The third connecting member 35 is also provided with engaging portions 35b, 35c, to which are fitted the first and second connecting members 33, 34, and is formed to substantially a disc shape.

The mounting portion 35a is substantially in the form of a flat disc and has respective surfaces 32a, 32b at mid portions thereof, so that these surfaces 32a, 32b face the end faces 102a, 101a of the optical fibers 102, 101, respectively.

The engaging portions 35b, 35c are formed on the outer periphery of the mounting portion 35a to protrude towards the back sides of the optical fibers 101, 102 subsequently at right angles to the mounting portion 35a. In the inner periphery of the engaging portion 35b is formed a groove 35d engaged by the engaging portion 42a of the flange-shaped protrusion 42. The groove 35d is formed to substantially the shape of a recessed torus surface. In the inner periphery of the engaging portion 35c is formed a groove 35e engaged by the engaging portion 44a. The groove 35e is formed to substantially the shape of a recessed torus surface.

The optical fiber connector 31, constructed as described above, is arranged by fitting the first connecting member 33 and the second connecting member 34 on the third connecting member 35, for connecting the end faces 101a, 102a of the optical fibers 101, 102 loaded on the first and second connecting members 33, 34, respectively, to the refractive index matching member 32, with the end faces 101a, 102a facing each other. Since the refractive index matching member 32 has the refractive index equal to that of the optical fibers 101, 102, it becomes possible to suppress the Fresnel reflection occurring on the end faces 101a, 102a of the optical fibers 101, 102.

With the above-described optical fiber connector 31, the refractive index matching member 32 can be exchanged easily, because the third connecting member 35 can be mounted in position or dismounted easily.

The foregoing description has been directed to the interconnection of optical fibers. However, the optical fiber connector of the present invention can be applied to all optical guide paths as a device for prohibiting Fresnel reflection of the optical guide paths.

The foregoing description also has been directed to the application of the optical fiber connector 1 to LAN (local area network) in the household, that is in a home network or in an office LAN. The present invention is, however, not limited thereto and can also be applied to the communication system for exchanging variable information in mobile bodies, such as cars or aircraft.

Also, in the foregoing description, the wavelength of the light beams, the refractive index of which is to be matched, is set to 650 nm. However, it is of course possible to use other wavelength ranges.

What is claimed is:

1. An optical fiber connector for interconnecting a first optical fiber and a second optical fiber comprising:

refractive index matching means having a refractive index subsequently equivalent to that of cores of said first and second optical fibers;

wherein said refractive index matching means is formed by an elastic body;

and wherein said refractive index matching means includes junction surfaces connected to an end face of said first optical fiber and to an end face of said second optical fiber;

and optical fiber connecting means for interconnecting said first and second optical fibers in a state in which end faces of said first and second optical fibers are contacted with said refractive index matching means interposed between said first and second optical fibers and wherein the end face of said first optical fiber is protruding beyond a contact area of said connecting means;

wherein said optical fiber connecting means tightly connects the end faces of said first and second optical fibers to said junction surfaces by elastic deformation of said refractive index matching means;

wherein said optical fiber connecting means is made up of a first connecting portion, mounted in the vicinity of an end face of said first optical fiber, and a second connecting portion, mounted in the vicinity of an end face of said second optical fiber; and wherein said first and second connecting portions are interconnected to connect the end face of said first optical fiber and the end face of said second optical fiber in a state in which said end faces are contacted with said refractive index matching means by elastic deformation of said first and second connecting portions caused by connection of said first and second connecting portions and said first connecting portion forms a substantially convex torus and said second connecting portion forms a substantially recessed torus.

2. The optical fiber connector according to claim 1 wherein said refractive index matching means is formed of silicone.

3. The optical fiber connector according to claim 1 wherein said first and second connecting portions are detachable from each other.

4. The optical fiber connector according to claim 1 wherein a first optical communication circuit is connected to the other end face of said first optical fiber and a second optical communication circuit is connected to the other end face of said second optical fiber.

5. A network system for interconnecting a plurality of electronic equipments comprising:

a first electronic equipment including a first optical communication circuit, an optical fiber connector, and a first fiber for interconnecting said first optical communication circuit and said optical fiber connector;

a second electronic equipment having a second optical communication circuit; and a second optical fiber for interconnecting the optical fiber connector of said first electronic equipment and said second optical communication circuit of said second electronic equipment;

said optical fiber connector of said first electronic equipment including refractive index matching means having a refractive index subsequently equivalent to that of cores of said first and second optical fibers;

wherein said refractive index matching means is formed by an elastic body;

and wherein said refractive index matching means includes junction surfaces connected to an end face of said first optical fiber and to an end face of said second optical fiber;

and optical fiber connecting means for interconnecting said first and second optical fibers in a state in which end faces of said first and second optical fibers are contacted with said refractive index matching means interposed between said first and second optical fibers and wherein the end face of said first optical fiber is protruding beyond a contact area of said connecting means;

wherein said optical fiber connecting means tightly connects the end faces of said first and second optical fibers to said junction surfaces by elastic deformation of said refractive index matching means;

wherein said optical fiber connecting means is made up of a first connecting portion, mounted in the vicinity of an end face of said first optical fiber, and a second connecting portion, mounted in the vicinity of an end face of said second optical fiber; and wherein said first and second connecting portions are interconnected to connect the end face of said first optical fiber and the end face of said second optical fiber in a state in which said end faces are contacted with said refractive index matching means by elastic deformation of said first and second connecting portions caused by connection of said first and second connecting portions and said first connecting portion forms a substantially convex torus and said second connecting portion forms a substantially recessed torus.

6. An electronic equipment having an optical communication circuit, comprising:

an optical fiber connector; and an optical fiber for interconnecting said optical communication circuit and said optical fiber connector;

said optical fiber connector including refractive index matching means having a refractive index subsequently equivalent to that of cores of said first and second optical fibers;

wherein said refractive index matching means is formed by an elastic body;

and wherein said refractive index matching means includes junction surfaces connected to an end face of said first optical fiber and to an end face of said second optical fiber;

and optical fiber connecting means for interconnecting said first and second optical fibers in a state in which end faces of said first and second optical fibers are contacted with said refractive index matching means interposed between said first and second optical fibers and wherein the end face of said first optical fiber is protruding beyond a contact area of said connecting means;

wherein said optical fiber connecting means tightly connects the end faces of said first and second optical fibers to said junction surfaces by elastic deformation of said refractive index matching means;

wherein said optical fiber connecting means is made up of a first connecting portion, mounted in the vicinity of an end face of said first optical fiber, and a second connecting portion, mounted in the vicinity of an end face of said second optical fiber; and wherein said first and second connecting portions are interconnected to connect the end face of said first optical fiber and the end face of said second optical fiber in a state in which said end faces are contacted with said refractive index matching means by elastic deformation of said first and second connecting portions caused by connection of said first and second connecting portions and said first connecting portion forms a substantially convex torus and said second connecting portion forms a substantially recessed torus.

* * * * *